US012205755B2

(12) United States Patent
Yen et al.

(10) Patent No.: US 12,205,755 B2
(45) Date of Patent: Jan. 21, 2025

(54) INDUCTOR STRUCTURE

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 900 days.

(21) Appl. No.: 17/159,430

(22) Filed: Jan. 27, 2021

(65) Prior Publication Data

US 2022/0068552 A1 Mar. 3, 2022

(30) Foreign Application Priority Data

Aug. 25, 2020 (TW) ................................ 109128973

(51) Int. Cl.
*H01F 27/28* (2006.01)
*H01F 27/29* (2006.01)

(52) U.S. Cl.
CPC ......... *H01F 27/29* (2013.01); *H01F 27/2823* (2013.01)

(58) Field of Classification Search
CPC ................. H01F 27/29; H01F 27/2823; H01F 2017/0073; H01F 17/0006
USPC ......................................... 336/192, 200, 198
See application file for complete search history.

(56) References Cited

U.S. PATENT DOCUMENTS

2003/0210122 A1* 11/2003 Concord ................ H01F 5/003 336/200
2006/0077028 A1* 4/2006 Huang ................ H01F 17/0006 336/223
2010/0295648 A1* 11/2010 Huang ................ H01F 17/0006 336/200
2011/0032067 A1 2/2011 Le Guillou et al.
2017/0098500 A1 4/2017 Yen et al.
2019/0221350 A1* 7/2019 Yen ..................... H01F 27/2804
2019/0279809 A1* 9/2019 Yen ..................... H01F 17/0006
2020/0312511 A1 10/2020 Yen et al.
2020/0312512 A1 10/2020 Yen et al.
2020/0312521 A1 10/2020 Yen et al.
(Continued)

FOREIGN PATENT DOCUMENTS

TW I591800 B 7/2017
TW 201806112 A 2/2018
(Continued)

*Primary Examiner* — Shawki S Ismail
*Assistant Examiner* — Kazi S Hossain
(74) *Attorney, Agent, or Firm* — Locke Lord LLP; Tim Tingkang Xia, Esq.

(57) ABSTRACT

An inductor structure includes a first connecting component, a second connecting component, and a center-tap terminal. In the inductor structure, a first port of the first connecting component is coupled to a first wire, and a second port of the first connecting component is coupled to a second wire. The second connecting component disposed above or beneath the first connecting component in an interlaced manner. The center-tap terminal is coupled to one of the first connecting component and the second connecting component. The center-tap terminal is disposed on a layer that is different from the layer where the first connecting component is disposed or the layer where the second connecting component is disposed.

20 Claims, 5 Drawing Sheets

(56) References Cited

U.S. PATENT DOCUMENTS

| | | | |
|---|---|---|---|
| 2020/0312524 | A1 | 10/2020 | Yen et al. |
| 2020/0312530 | A1 | 10/2020 | Yen et al. |

FOREIGN PATENT DOCUMENTS

| | | | |
|---|---|---|---|
| TW | 201933384 | A | 8/2019 |
| TW | I692780 | B | 5/2020 |
| TW | I694475 | B | 5/2020 |
| TW | I703588 | B | 9/2020 |
| TW | I703591 | B | 9/2020 |
| TW | I703592 | B | 9/2020 |
| TW | I707369 | B | 10/2020 |
| WO | 2009101565 | A1 | 8/2009 |

* cited by examiner

INDUCTOR STRUCTURE

CROSS-REFERENCE TO RELATED APPLICATION

This application claims priority to and the benefit of Taiwan Application Serial Number 109128973, filed on Aug. 25, 2020, the entire content of which is incorporated herein by reference as if fully set forth beneath in its entirety and for all applicable purposes.

BACKGROUND

Field of Disclosure

The disclosure generally relates to an inductor device, and more particularly, to an inductor structure that is disposed on the inductor device.

Description of Related Art

The various types of inductors according to the prior art have their advantages and disadvantages. For example, the 8-shaped inductor has two sets of coils that sense the current respectively in a different direction such that the inductance is offset. Therefore, the coupling between the 8-shaped inductor and another object which is a magnetic source occurs at a small probability. However, an eight-shaped inductor occupies a larger area in a device and its quality factor is low, and its parasitic capacitance is large. The double spiral series inductor has a high-quality factor (Q value) and a large mutual inductance, however, the shape of the double spiral series inductor is asymmetric and the ability to prevent the outside interference is worse than the 8-shaped inductor. Accordingly, the application ranges of the above inductors are all limited.

SUMMARY

The disclosure can be more fully beneath stood by reading the following detailed description of the embodiments, with reference made to the accompanying drawings as described beneath. It should be noted that the features in the drawings are not necessarily to scale. The dimensions of the features may be arbitrarily increased or decreased for clarity of discussion.

The present disclosure of an embodiment provides an inductor structure that includes a first connecting component, a second connecting component, and a center-tap terminal. A first port of the first connecting component is coupled to a first wire, and a second port of the first connecting component is coupled to a second wire. The second connecting component is disposed above or beneath the first connecting component in an interlaced manner. The center-tap terminal is coupled to one of the first connecting component and the second connecting component, and the center-tap terminal is disposed on a layer that is different from the layer where the first connecting component is disposed or the layer where the second connecting component is disposed.

It is to be beneath stood that both the foregoing general description and the following detailed description are by examples, and are intended to provide further explanation of the disclosure as claimed.

BRIEF DESCRIPTION OF THE DRAWINGS

The disclosure can be more fully beneathstood by reading the following detailed description of the embodiments, with reference made to the accompanying drawings as described beneath. It should be noted that the features in the drawings are not necessarily to scale. The dimensions of the features may be arbitrarily increased or decreased for clarity of discussion.

DETAILED DESCRIPTION

The technical terms "first", "second" and similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Figure 1:
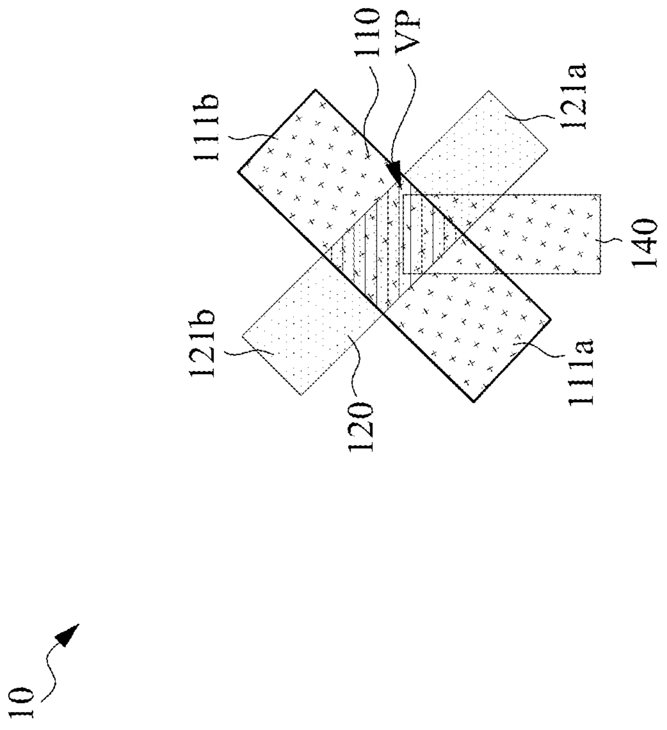
FIG. 1 depicts a diagram of an inductor structure according to some embodiments of the present disclosure.

Reference is made to FIG. 1. FIG. 1 depicts a diagram of an inductor structure 10 according to some embodiments of the present disclosure. As shown in FIG. 1, the inductor structure 10 includes a first connecting component 110, a second connecting component 120, and a center-tap terminal 140. The second connecting component 120 is disposed above or beneath the first connecting component 110 in an interlaced manner. The center-tap terminal 140 is coupled to one of the first connecting component 110 and the second connecting component 120. The layer where the center-tap terminal 140 is disposed is different from the layer where the first connecting component 110 is disposed or the layer where the second connecting component 120 is disposed. For example, the center-tap terminal 140 is coupled to the first connecting component 110, and both the center-tap terminal 140 is coupled to the first connecting component 110 are disposed on the same layer, whereas the second connecting component 120 is disposed on the other layer. For another example, the center-tap terminal 140 is coupled to the second connecting component 120, and both the center-tap terminal 140 and the second connecting component 120 are disposed on the same layer, whereas the first connecting component 110 is disposed on the other layer. FIG. 1 shows an embodiment that the center-tap terminal 140 is coupled to the first connecting component 110 and both the center-tap terminal 140 and the first connecting component 110 are disposed on the same layer, whereas the second connecting component 120 is disposed on the other layer. The one of the first connecting component 110 and the second connecting component 120 includes a vertical projection VP that the first connecting component 110 is interlaced with the second connecting component 120. The center-tap terminal 140 includes a portion that the center-tap terminal 140 is coupled to the one of the first connecting component 110 and the second connecting component 120. The vertical projection VP at least partially overlaps with the portion of the center-tap terminal 140. FIG. 1 shows an embodiment that the first connecting component 110 includes a vertical projection VP (marked in a pattern with horizontal lines as shown in FIG. 1) that the first connecting component 110 is interlaced with the second connecting component 120, and the center-tap terminal 140 includes a portion that the center-tap terminal 140 is coupled to the first connecting component 110, and the vertical projection VP at least partially overlaps with the portion of the center-tap terminal 140.

Figure 2:
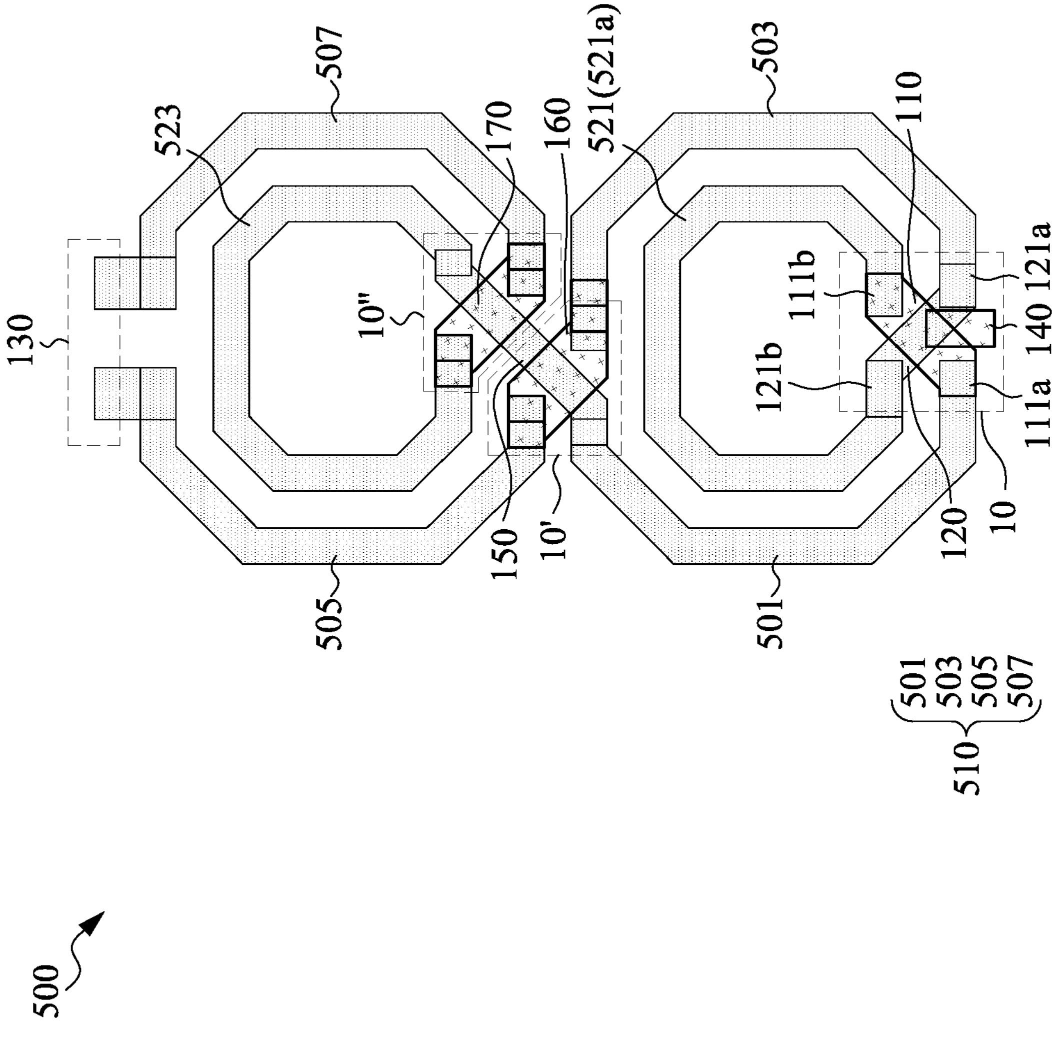
FIG. 2 depicts a diagram of an inductor device that an inductor structure is disposed thereon according to some embodiments of the present disclosure.

An embodiment is described beneath that the center-tap terminal 140 is coupled to the first connecting component 110 and both are disposed on the same layer. Reference is made to FIG. 1 and FIG. 2. FIG. 2 depicts a diagram of an inductor device 500 that an inductor structure 10 is disposed thereon according to some embodiments of the present disclosure. The inductor device 500 includes wires 501, 503, 505, 507, 521, and 523. As shown in FIG. 2, a first port 111*a* of the first connecting component 110 is coupled to the first wire 501. A second port 111*b* of the first connecting component 110 is coupled to the second wire 521. In some embodiments, the center-tap terminal 140 is coupled to any position between the first port 111*a* and the second port 111*b* of the first connecting component 110. For example, the center-tap terminal 140 is coupled to a central port, the first port 111*a*, and the second port 111*b* of the first connecting component 110, though the connection position is not limited thereto.

In some embodiments, a first port 121*a* of the second connecting component 120 is coupled to the third wire 503. A second port 121*b* of the second connecting component 120 is coupled to the wire 521*a* (hereinafter referred to as a fourth wire). The embodiment which is shown in FIG. 2 is that the second wire 521 and the fourth wire 521*a* are the same wire. In some other embodiments, the second wire and the fourth wire can be different wires according to the wire configuration of the inductor device 500, that is, the second wire and the fourth wire can be different wires.

In some embodiments, the second connecting component 120 is disposed on the first layer. The center-tap terminal 140 and the first connecting component 110 are disposed on the second layer, and the first layer is different from the second layer. For example, the first layer a lower layer, and the second layer is an upper layer above the first layer.

In some embodiments, the first wire 501, the second wire 521, the third wire 503, the fourth wire 521*a*, and the second connecting component 120 are disposed on the first layer, e.g., the lower layer. In other words, the first wire 501, the second wire 521, the third wire 503, the fourth wire 521*a*, and the second connecting component 120 are all disposed on the layer beneath the layer that the center-tap terminal 140 and the first connecting component 110 are disposed.

In some embodiments, the second wire 521 includes a spiral wire having one or more spirals or circles. As shown in FIG. 2, the second wire 521 is the wire having one circle.

In some embodiments, the first wire 501 and the third wire 503 are disposed on an outer wire of the second wire 521.

In some embodiments, the inductor device 500 includes an input terminal 130. As shown in FIG. 2, the input terminal 130 is coupled to the wires 505 and 507. Because the input terminal 130 and the center-tap terminal 140 are disposed on two sides of the inductor device 500, the inductor device 500 presents the symmetric structure.

It should be noted that the inductor structure 10 in FIG. 1 can be configured to any crossing portion of the inductor device 500 in FIG. 2. In the inductor structure 10 shown in FIG. 2, the first connecting component 110 crosses over the second connecting component 120, and the center-tap terminal 140 is coupled to the crossing portion of the first connecting component 110 and the second connecting component 120. In some embodiments, the inductor device 500 further includes an inductor structure 10' which also has the crossing portion and the center-tap terminal 140 is disposed on the inductor structure 10'. In the other embodiments, the inductor device 500 further includes an inductor structure 10" which also has the crossing portion, and the center-tap terminal 140 is disposed on the inductor structure 10". In the other embodiments, the center-tap terminal 140 is disposed on any position between two ends of the connecting component 150. In other words, the position to configure the center-tap terminal 140 is not limited thereto, the embodiments reveal that the center-tap terminal 140 can be disposed on any of the inductor structures 10, 10', and 10" for description.

Reference is further made to FIG. 2. In some embodiments, the inductor device 500 includes an 8-shaped inductor structure 510 and connecting components 150, 160, and 170. The 8-shaped inductor structure 510 includes the wires 501, 503, 505, and 507. The connecting components 160 and 170 cross over or beneath the connecting component 150 to couple to the wires 501, 503, 505, and 507. The inductor structure 10' is configured to the crossing portion of the central 8-shaped inductor structure 510, and the center-tap terminal (not shown in the figure) can be coupled to the connecting component 160. The center-tap terminal (not shown in the figure) can be disposed on any position between two ends of the connecting component 160. In some other embodiments, the inductor structure 10" is configured to the crossing portion of the central 8-shaped inductor structure 510, and the center-tap terminal (not shown in the figure) can be coupled to the connecting component 170. The center-tap terminal (not shown in the figure) can be disposed on any position between two ends of the connecting component 170. In some other embodiments, the center-tap terminal (not shown in the figure) can be disposed on any position between two ends of the connecting component 150. The inductor structure 10' and the inductor structure 10" contain similar features to the feature of the inductor structure 10, and the description is not repeated herein. In some embodiments, the inductor structures 10, 10', and 10" are suitable for any inductor device whose structure includes two connecting components and the center-tap terminal.

Figure 3:
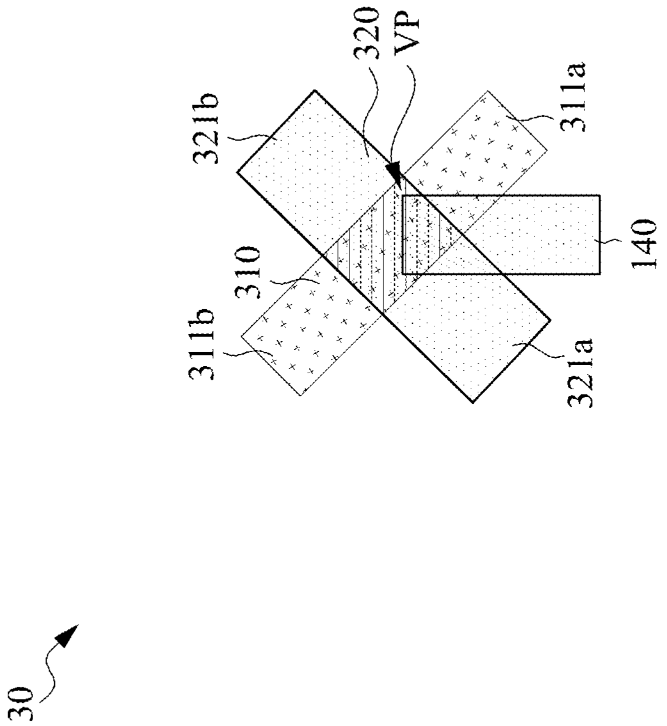
FIG. 3 depicts a diagram of an inductor structure according to some embodiments of the present disclosure.

Reference is made to FIG. 3. FIG. 3 depicts a diagram of an inductor structure 30 according to some embodiments of the present disclosure. As shown in FIG. 3, the inductor structure 30 includes a first connecting component 310, a second connecting component 320, and the center-tap terminal 140. The second connecting component 320 crosses over or beneath the first connecting component 310 in an interlaced manner. The center-tap terminal 140 is coupled to one of the first connecting component 310 and the second connecting component 320. The center-tap terminal 140 is disposed on the layer which is different from the layer where the first connecting component 310 is disposed or the layer where the second connecting component 320 is disposed. In FIG. 3, the center-tap terminal 140 is coupled to the second connecting component 320, and both the center-tap terminal 140 and the second connecting component 320 are disposed on the same layer, whereas the first connecting component 310 is disposed on the other layer. FIG. 3 shows an embodiment that the second connecting component 120 includes a vertical projection VP (marked in a pattern with horizontal lines as shown in FIG. 3) that the first connecting component 110 is interlaced with the second connecting component 120, and the center-tap terminal 140 includes a portion that the center-tap terminal 140 is coupled to the second connecting component 120, and the vertical projection VP at least partially overlaps with the portion of the center-tap terminal 140.

Reference is further made to FIG. 1. In the inductor structure 10 of FIG. 1, the center-tap terminal 140 is coupled to the first connecting component 110 and is coupled to the second connecting component 120 by a jumper wire, such that the inductor structure 10 which is configured to the inductor device 500 of FIG. 2 presents the structure that the center-tap terminal 140 and the first connecting component 110 are at the same layer, whereas the second connecting component 120 and the wires of the inductor device 500 are at the other layer. On the contrary, in the inductor structure 30 of FIG. 3, the center-tap terminal 140 is coupled to the second connecting component 320 and is coupled to the first connecting component 310 by the jumper wire, such that the inductor structure 30 which is configured to the inductor device 600 of FIG. 4 represents the structure that the first connecting component 310 is at one layer, whereas the center-tap terminal 140, the second connecting component 320, and the wires of the inductor device 600 are at the other layer.

Figure 4:
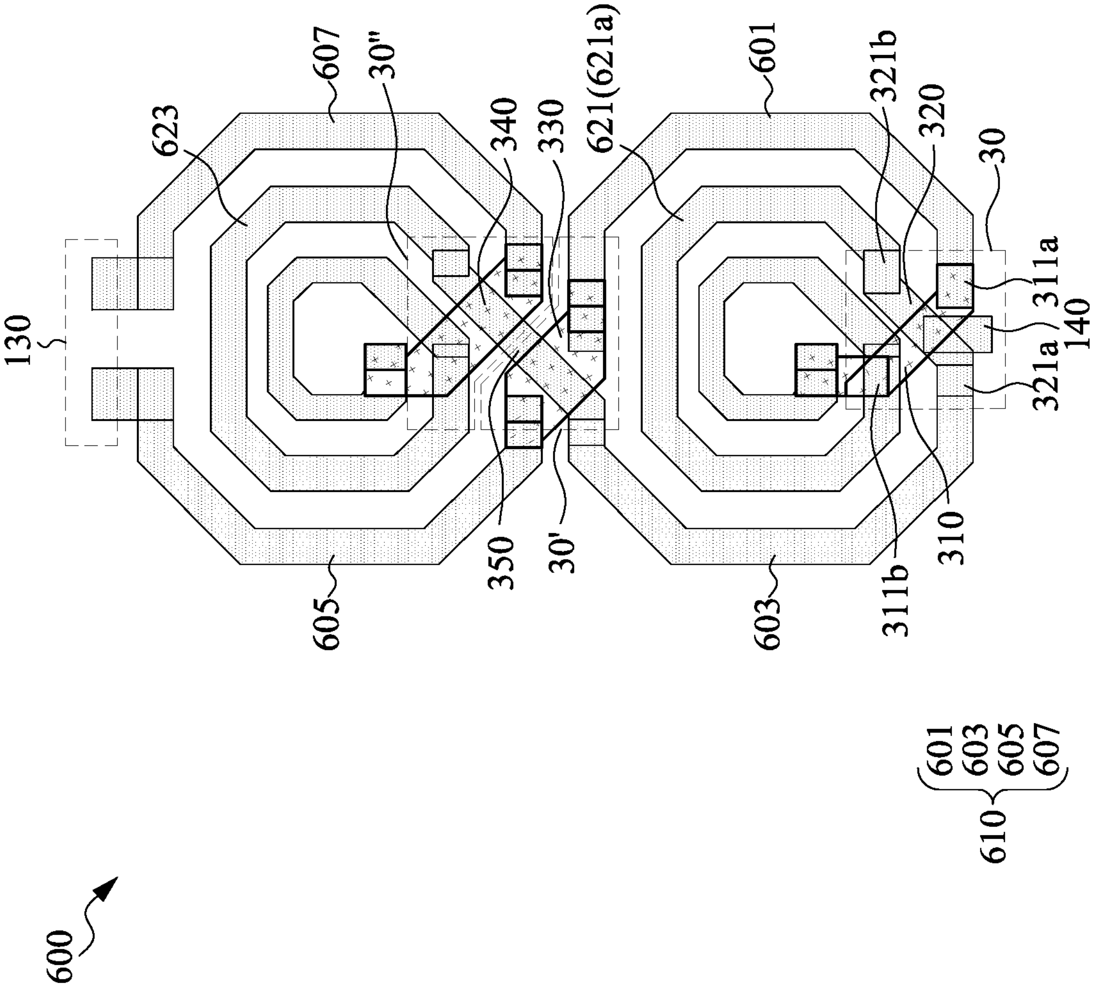
FIG. 4 depicts a diagram of an inductor device that an inductor structure is disposed thereon according to some embodiments of the present disclosure.

For facilitating the understanding of the structure and the function of the inductor structure 30 which is configured to the inductor device, FIG. 4 is illustrated for the embodiments and described as follows.

Reference is made to FIG. 4. FIG. 4 depicts a diagram of an inductor device 600 that an inductor structure 30 is disposed thereon according to some embodiments of the present disclosure. As shown in FIG. 4, the inductor device 600 includes wires 601, 603, 605, 607, 621, and 623. The inductor structure 30 includes the first connecting component 310, the second connecting component 320, and the center-tap terminal 140. A first port 311*a* of the first connecting component 310 is coupled to the first wire 601. A second port 311*b* of the first connecting component 310 is coupled to the second wire 621. A first port 321*a* of the second connecting component 320 is coupled to the third wire 603. A second port 321*b* of the second connecting component 320 is coupled to the wire 621*a* (hereinafter referred to as a fourth wire). In the embodiment, the second wire 621 and the fourth wire 621*a* are the same wire. In some other embodiments, the second wire and the fourth wire can be different wires according to the wire configuration of the inductor device 600.

In some embodiments, the center-tap terminal 140 is coupled to any position between the first port 321*a* of the second connecting component 320 and the second port 321*b* of the second connecting component 320. For example, the center-tap terminal 140 is coupled to a central port, the first port 321*a*, and the second port 321*b* of the second connecting component 320, though the connection position is not limited thereto.

In some embodiments, the center-tap terminal 140 and the second connecting component 320 are disposed on the first layer, whereas the first connecting component 310 is disposed on the second layer, and the first layer is different from the second layer.

In some embodiments, the first wire 601, the second wire 621, the third wire 603, the center-tap terminal 140, and the second connecting component 320 are disposed on the first layer.

In some embodiments, the second wire 621 includes a spiral wire having one or more circles. As shown in FIG. 4, the second wire 621 is the spiral wire having many circles.

In some embodiments, the first wire 601 and the third wire 603 are disposed on an outer wire of the second wire 621.

In some embodiments, the inductor device 600 includes the input terminal 130. As shown in FIG. 4, the input terminal 130 is coupled to wires 605 and 607. Because the input terminal 130 and the center-tap terminal 140 are disposed on two sides of the inductor device 600, the inductor device 600 presents the symmetric structure.

It should be noted that the inductor structure 30 in FIG. 3 can be configured to any crossing portion of the inductor device 600 in FIG. 4. In the inductor structure 30 shown in FIG. 4, the connecting component 310 crosses over the connecting component 320, and the center-tap terminal 140 is coupled to the crossing portion of the connecting component 310 and the connecting component 320. In some embodiments, the inductor device 600 further includes an inductor structure 30' which also has the crossing portion and the center-tap terminal 140 is disposed on the inductor structure 30'. In the other embodiments, the inductor device 600 further includes an inductor structure 30" which also has the crossing portion, and the center-tap terminal 140 is disposed on the inductor structure 30". In the other embodiments, the center-tap terminal 140 is disposed on any position between two ends of the connecting component 350. In other words, the position to configure the center-tap terminal 140 is not limited thereto, the embodiments reveal that the center-tap terminal 140 can be disposed on any structure having the crossing portion.

Reference is further made to FIG. 4. In some embodiments, the inductor device 600 includes an 8-shaped inductor structure 610 and connecting components 330, 340, and 350. The 8-shaped inductor structure 610 includes wire 601, 603, 605, and 607. The connecting components 330 and 340 cross over or beneath the connecting component 350 to couple to the wires 601, 603, 605, and 607. The inductor structure 30' is configured to the crossing portion of the central 8-shaped inductor structure 610, and the center-tap terminal (not shown in the figure) can be coupled to the connecting component 330. The center-tap terminal (not shown in the figure) can be disposed on any position between two ends of the connecting component 330. In some other embodiments, the inductor structure 10" is configured to the crossing portion of the central 8-shaped inductor structure 610, and the center-tap terminal (not shown in the figure) can be coupled to the connecting component 340. The center-tap terminal (not shown in the figure) can be disposed on any position between two ends of the connecting component 340. In some other embodiments, the center-tap terminal (not shown in the figure) can be disposed on any position between two ends of the connecting component 350. The inductor structure 30' and the inductor structure 30" contain similar features to the feature of the inductor structure 30, and the description is not repeated herein. In some embodiments, the inductor structures 30, 30', and 30" are suitable for any inductor device whose structure includes two connecting components and the center-tap terminal.

Figure 5:
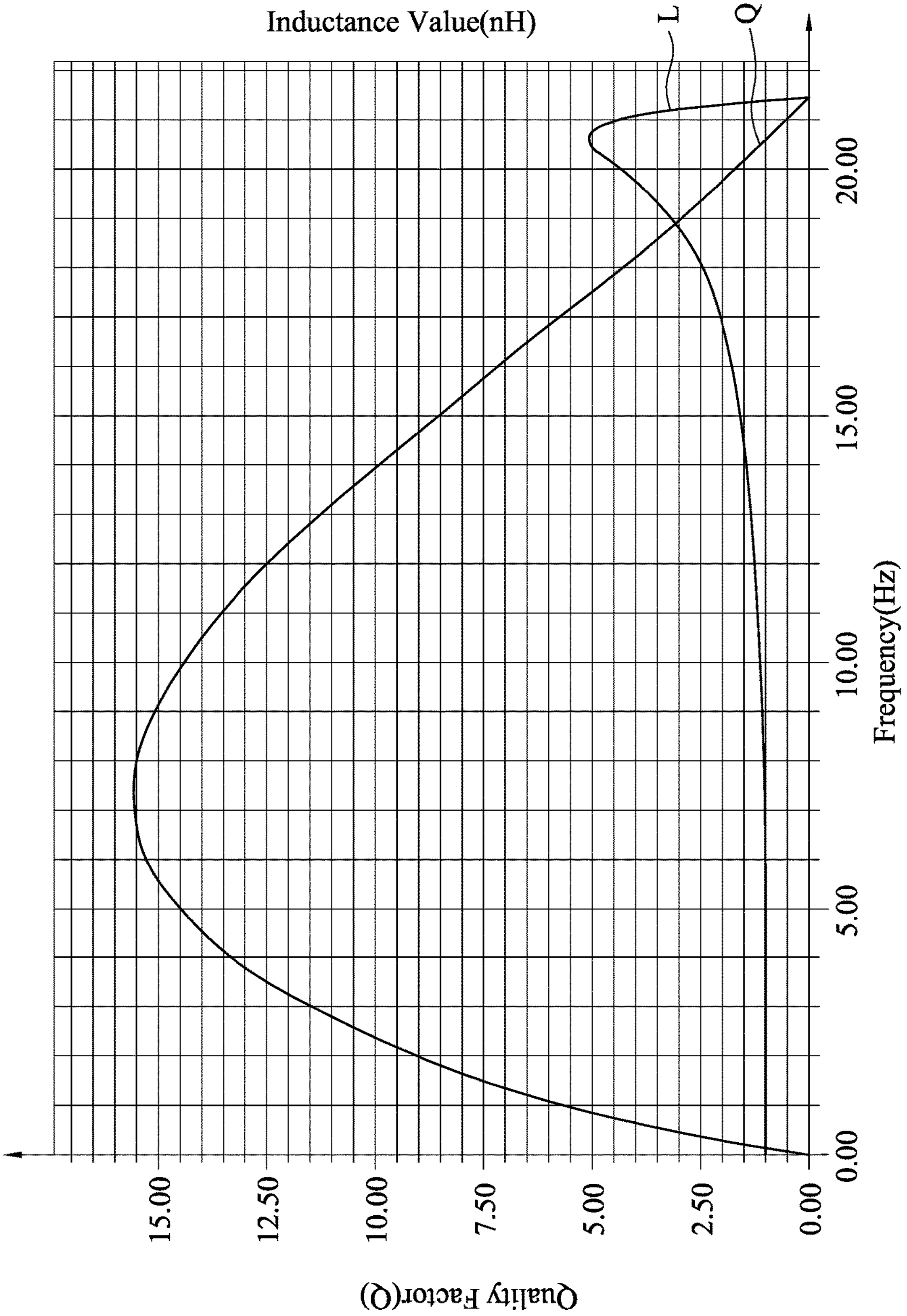
FIG. 5 depicts a schematic diagram of the experimental data of an inductor device that an inductor is disposed thereon according to some embodiment of the present disclosure.

Reference is made to FIG. 5. FIG. 5 depicts a schematic diagram of the experimental data of an inductor device that an inductor is disposed thereon according to some embodiment of the present disclosure. As shown in FIG. 5, the experimental curve of the quality factor of the inductor device adopting the structural configuration of the present disclosure is Q and the experimental curve of the inductance value is L, and the value of the curve L (i.e., the inductance value nH) is referred to as the value of the curve Q (i.e., the quality factor, as the Y-axis value on the left side shown in FIG. 5). As can be seen from FIG. 5, the inductor device adopting the structure of the present disclosure has a good inductance value per unit area. For example, when the area of the inductor device is (or smaller than) 12 um*8 um or 14 um*8 um, the inductance value is about 1.11 at the frequency 7 GHz of the curve L and the quality factor is about 17.85 at the frequency 7 GHz of the curve Q. Furthermore, as shown in curve L, the inductance value is about 1.14 nH at the frequency 8 GHz, and the quality factor is about 17.77 as shown in curve Q.

Accordingly, at least the above embodiments disclose the position of the center-tap terminal in the inductor structure, and the center-tap terminal is disposed above or beneath one of the two connecting components of the inductor structure, such that the inductor device is provided with the symmetric structure. When the coupling occurs (if any) on the left and right sides and the upper and lower sides of the inductor device, the inductor structure can increase the electric symmetry of the inductor device. Therefore, the inductor structure of the present disclosure can make the inductor device having a better inductance value per unit area.

It will be apparent to those skilled in the art that various modifications and variations can be made to the structure of the present disclosure without departing from the scope or spirit of the disclosure. Given the foregoing, it is intended that the present disclosure cover modifications and variations of this disclosure provided they fall within the scope of the following claims.

What is claimed is:

1. An inductor structure, comprising:

a first connecting component, wherein a first port of the first connecting component is coupled to a first wire, and a second port of the first connecting component is coupled to a second wire;

a second connecting component, disposed above or beneath the first connecting component in an interlaced manner; and a center-tap terminal, coupled to one of the first connecting component and the second connecting component, such that the center-tap terminal and one of the first connecting component and the second connecting component are disposed on a same layer, and the center-tap terminal and another one of the first connecting component and the second connecting component are disposed on different layers;

wherein the one of the first connecting component and the second connecting component includes a vertical projection that the first connecting component is interlaced with the second connecting component, wherein the center-tap terminal includes a portion that the center-tap terminal is coupled to the one of the first connecting component and the second connecting component, wherein the vertical projection at least partially overlaps with the portion.

2. The inductor structure of claim 1, wherein the center-tap terminal is coupled to any position between the first port of the first connecting component and the second port of the first connecting component.

3. The inductor structure of claim 2, wherein the center-tap terminal is coupled to a central port between the first port of the first connecting component and the second port of the first connecting component.

4. The inductor structure of claim 2, wherein the center-tap terminal is coupled to the first port of the first connecting component.

5. The inductor structure of claim 2, wherein the center-tap terminal is coupled to the second port of the first connecting component.

6. The inductor structure of claim 2, wherein the second connecting component is disposed on a first layer, and the center-tap terminal and the first connecting component are disposed on a second layer.

7. The inductor structure of claim 6, wherein the first layer is different from the second layer.

8. The inductor structure of claim 6, wherein a first port of the second connecting component is coupled to a third wire, and a second port of the second connecting component is coupled to a fourth wire; and wherein the first wire, the second wire, the third wire, the fourth wire, and the second connecting component are disposed on the first layer.

9. The inductor structure of claim 8, wherein the second wire and the fourth wire are a same wire.

10. The inductor structure of claim 9, wherein the second wire comprises a spiral wire comprising one or more circles.

11. The inductor structure of claim 8, wherein the first wire and the third wire are disposed on an outer wire of the second wire.

12. The inductor structure of claim 1, wherein the center-tap terminal is coupled to any position between a first port of the second connecting component and a second port of the second connecting component.

13. The inductor structure of claim 12, wherein the center-tap terminal is coupled to a central port between the first port of the second connecting component and the second port of the second connecting component.

14. The inductor structure of claim 12, wherein the center-tap terminal is coupled to the first port of the second connecting component.

15. The inductor structure of claim 12, wherein the center-tap terminal is coupled to the second port of the second connecting component.

16. The inductor structure of claim 12, wherein the center-tap terminal and the second connecting component are disposed on a first layer, and the first connecting component is disposed on a second layer.

17. The inductor structure of claim 16, wherein the first layer is different from the second layer.

18. The inductor structure of claim 16, wherein a first port of the second connecting component is coupled to a third wire, and a second port of the second connecting component is coupled to a fourth wire; and wherein the first wire, the second wire, the third wire, the fourth wire, the center-tap terminal, and the second connecting component are disposed on the first layer.

19. The inductor structure of claim 18, wherein the second wire and the fourth wire are a same wire.

20. The inductor structure of claim 18, wherein the first wire and the third wire are disposed on an outer wire of the second wire and the fourth wire.

* * * * *